(12) United States Patent
Mesquita et al.

(10) Patent No.: US 11,855,679 B2
(45) Date of Patent: *Dec. 26, 2023

(54) ANTENNA INTERFACE ARRANGEMENT

(71) Applicant: Telefonaktiebolaget LM Ericsson (publ), Stockholm (SE)

(72) Inventors: Fabien Mesquita, Limhamn (SE); Stefan Andersson, Flyinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/802,287

(22) PCT Filed: Mar. 20, 2020

(86) PCT No.: PCT/EP2020/057848
§ 371 (c)(1),
(2) Date: Aug. 25, 2022

(87) PCT Pub. No.: WO2021/185458
PCT Pub. Date: Sep. 23, 2021

(65) Prior Publication Data
US 2023/0102583 A1 Mar. 30, 2023

(51) Int. Cl.
*H04B 1/58* (2006.01)
(52) U.S. Cl.
CPC .................... *H04B 1/581* (2013.01)
(58) Field of Classification Search
CPC ............................. H04B 1/525; H04B 1/581
See application file for complete search history.

(56) References Cited

U.S. PATENT DOCUMENTS 9,780,437 B2   10/2017   Knox
2007/0117524 A1   5/2007   Do
(Continued)

FOREIGN PATENT DOCUMENTS

CO   2019009868 A2   10/2019
GB   2480404 A   11/2011
(Continued)

OTHER PUBLICATIONS

Chen, Liang, et al., "A Monolithic Dual-Band 77/94 GHz Transceiver Front-End With Shared Frequency Multiplier", IEEE Access, vol. 9, 2019, pp. 177784-177792.
(Continued)

*Primary Examiner* — Junpeng Chen
(74) *Attorney, Agent, or Firm* — Murphy, Bilak & Homiller, PLLC (57) ABSTRACT

An antenna interface arrangement is disclosed for cancellation of a transmit signal at a receiver port of a transceiver. The antenna interface arrangement comprises a distributed transformer and an impedance. The distributed transformer has a primary side winding connectable to an antenna port of the transceiver and having a first part (111) and a second part (112), a first secondary side winding (113) connectable to a transmitter port of the transceiver and having a first inductive coupling to the first part of the primary side winding, and a second secondary side winding (114) connectable to the receiver port of the transceiver and having a second inductive coupling to the second part of the primary side winding. The impedance (106, 107) is connected between the first secondary side winding and the second secondary side winding. The first and second inductive couplings are adapted to provide a first version of the transmit signal at the receiver port, and the impedance is adapted to provide a second version of the transmit signal at (Continued)

the receiver port, for cancelling the first version of the transmit signal. In some embodiments, the antenna interface arrangement is also for cancellation of a received signal at the transmitter port of the transceiver. Corresponding transceiver and communication device are also disclosed. In some embodiments, the antenna interface arrangement is also for cancellation of a received signal at the transmitter port of the transceiver. Corresponding transceiver and communication device are also disclosed.

18 Claims, 2 Drawing Sheets

(56) References Cited

U.S. PATENT DOCUMENTS

| | | | |
|---|---|---|---|
| 2013/0194978 A1 | 8/2013 | Andersson et al. | |
| 2014/0009245 A1 | 1/2014 | Din et al. | |
| 2014/0315501 A1 | 10/2014 | Rudell et al. | |
| 2015/0222321 A1* | 8/2015 | Aandersson | H04B 1/525 |
| | | | 370/278 |
| 2015/0270864 A1* | 9/2015 | Bryant | H04L 5/14 |
| | | | 370/282 |
| 2016/0072542 A1* | 3/2016 | Din | H04B 1/525 |
| | | | 370/295 |
| 2016/0254898 A1 | 9/2016 | Sjoland et al. | |
| 2016/0294436 A1* | 10/2016 | Din | H04B 17/336 |
| 2017/0250728 A1 | 8/2017 | Afsahi et al. | |
| 2019/0132021 A1 | 5/2019 | Khatib et al. | |
| 2019/0334560 A1 | 10/2019 | Chi et al. | |

FOREIGN PATENT DOCUMENTS

| | | |
|---|---|---|
| TW | 201409954 A | 3/2014 |
| TW | 201946395 A | 12/2019 |
| WO | 2015031748 A1 | 3/2015 |
| WO | 2018172939 A1 | 9/2018 |

OTHER PUBLICATIONS

Van Liempd, Barend, et al., "A +70dBm IIP3 Single-Ended Electrical-Balance Duplexer in 0.18μm SOI CMOS", ISSCC 2015 / Session 2 / RF TX/RX Design Techniques / 2.2, Feb. 23, 2015, pp. 32-34.

* cited by examiner

ANTENNA INTERFACE ARRANGEMENT

TECHNICAL FIELD

The present disclosure relates generally to the field of antenna interfaces for transceivers where an antenna is shared by transmitter and receiver. More particularly, it relates to mitigation of signal leakage from transmitter to receiver.

BACKGROUND

Antenna interfaces are generally applicable for transceivers where an antenna is shared by transmitter and receiver. Sharing an antenna may cause signal leakage, e.g., from transmitter to receiver (a.k.a. self-interference). When a transmit signal (or part of a transmit signal) is leaked to the receiver, the receiver performance may be worsened compared to if there was no transmit signal leakage.

Thus, it may be desirable to mitigate signal leakage from transmitter to receiver for transceivers with a shared antenna. Mitigation of transmit signal leakage may be particularly desirable when transmission and reception occurs simultaneously and/or in a same frequency interval; e.g., when the transceiver is a full duplex transceiver or a half-duplex transceiver.

Self-interference mitigation may be solved by isolation (i.e., trying to minimize the leakage) or by cancellation (i.e., trying to subtract the leakage as seen by the receiver). Self-interference cancellation has the advantage that the cancellation typically accounts for transmitter impairments (e.g., power amplifier non-linearities).

Several approaches for self-interference mitigation exist; e.g., (passive or active) balanced duplexers, circulators, Wilkinson combiner, impedance balancing networks, etc. However, these solutions have drawbacks such as one or more of: sensitivity to antenna impedance, inherent 3 dB losses, relatively large physical size, high circuit complexity, hinders when attempting integration, incompatibility with full duplex operation (simultaneous transmission and reception using the same, or overlapping, frequency interval).

Thus, there is a need for alternative and/or improved antenna interfaces that provide mitigation of signal leakage from transmitter to receiver.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

Also generally, when a first feature is referred to herein as connectable to a second feature, the first feature may be configured to be connected to the second feature according to some embodiments, and may be connected to the second feature according to some embodiments.

It is an object of some embodiments to solve or mitigate, alleviate, or eliminate at least some of the above or other disadvantages.

A first aspect is an antenna interface arrangement for cancellation of a transmit signal at a receiver port of a transceiver. The antenna interface arrangement comprises a distributed transformer and an impedance.

The distributed transformer has a primary side winding connectable to an antenna port of the transceiver and having a first part and a second part, a first secondary side winding connectable to a transmitter port of the transceiver and having a first inductive coupling to the first part of the primary side winding, and a second secondary side winding connectable to the receiver port of the transceiver and having a second inductive coupling to the second part of the primary side winding.

The impedance is connected between the first secondary side winding and the second secondary side winding.

The first and second inductive couplings are adapted to provide a first version of the transmit signal at the receiver port.

The impedance is adapted to provide a second version of the transmit signal at the receiver port, for cancelling the first version of the transmit signal.

In some embodiments, the antenna interface arrangement is also for cancellation of a received signal at the transmitter port of the transceiver, wherein the first inductive coupling is further adapted to provide a first version of the received signal at the transmitter port, and wherein the second inductive coupling and the impedance are further adapted to provide a second version of the received signal at the transmitter port, for cancelling the first version of the received signal.

In some embodiments, a first end of the first part of the primary side winding is connectable to the antenna port of the transceiver, and a second end of the first part of the primary side winding is connected to a first end of the second part of the primary side winding, a first end of the first secondary side winding is connected to the impedance and is connectable to the transmitter port of the transceiver, and a first end of the second secondary side winding is connected to the impedance and is connectable to the receiver port of the transceiver.

In some embodiments, the transmitter port, the receiver port, and the antenna port are single-ended. In such embodiments, a second end of the second part of the primary side winding, a second end of the first secondary side winding, and a second end of the second secondary side winding may be connectable to a reference potential.

In some embodiments, the first and second inductive couplings are non-inverting inductive couplings.

In some embodiments, the transmitter port, the receiver port, and the antenna port are differential ports having a positive terminal and a negative terminal. In such embodiments, a second end of the second part of the primary side winding may be connectable to the antenna port of the transceiver, a second end of the first secondary side winding may be connectable to the transmitter port of the transceiver, and a second end of the second secondary side winding may be connectable to the receiver port of the transceiver.

In some embodiments, the first and second inductive couplings are non-inverting inductive couplings, and the impedance comprises an a first impedance connectable between the positive terminal of the transmitter port and the positive terminal of the receiver port and a second impedance connectable between the negative terminal of the transmitter port and the negative terminal of the receiver port.

In some embodiments, one of the first and second inductive couplings is an inverting inductive coupling, the other one of the first and second inductive couplings is a non-inverting inductive coupling, and the impedance comprises a first impedance connectable between the positive terminal of the transmitter port and the negative terminal of the receiver port and a second impedance connectable between the negative terminal of the transmitter port and the positive terminal of the receiver port.

In some embodiments, the impedance comprises a real valued part and/or an imaginary valued part.

In some embodiments, the impedance is adapted to compensate imperfections of the distributed transformer and/or impedance mismatches.

In some embodiments, the antenna interface arrangement further comprises one or more of: a first circuit element connected in parallel to the primary side winding, a second circuit element connected in parallel to the first secondary side winding, and a third circuit element connected in parallel to the second secondary side winding. Any of the first, second, and third circuit element may comprise a real valued part and/or an imaginary valued part, and may be adapted to compensate imperfections of the distributed transformer and/or impedance mismatches.

In some embodiments, one or more of a size of the first part of the primary side winding, a size of the second part of the primary side winding, a size of the first secondary side winding, a size of the second secondary side winding, and the impedance is selected for matching of transmitter port impedance and/or receiver port impedance.

Generally, when a size of (a part of) a winding is mentioned herein, the term "size" may refer to any suitable measure of the winding (e.g., one or more of: a number of turns/loops of the winding, a thickness of the winding wire, a cross-section form of the winding wire, a metric relating to the material of the winding wire, a metric relating to a core of the winding, etc.).

In some embodiments, an amplitude impact of the impedance on the transmit signal is equal to an amplitude impact on the transmit signal of a combination of the first inductive coupling and the second inductive coupling.

In some embodiments, a phase impact of the impedance on the transmit signal and a phase impact on the transmit signal of a combination of the first inductive coupling and the second inductive coupling has a modulo $2\pi$ phase difference equal to $\pi$ for a periodic transmit signal.

A second aspect is a transceiver comprising the antenna interface arrangement of the first aspect.

In some embodiments, the transceiver is a full-duplex transceiver or a half-duplex transceiver.

In some embodiments, the transceiver is a time division multiplex (TDD) transceiver.

A third aspect is a communication device comprising the antenna interface arrangement of the first aspect and/or the transceiver of the second aspect.

In some embodiments, any of the above aspects may additionally have features identical with or corresponding to any of the various features as explained above for any of the other aspects.

An advantage of some embodiments is that antenna interfaces are provided; configured to mitigate signal leakage from transmitter to receiver by cancellation.

An advantage of some embodiments is that antenna interfaces are provided; configured to mitigate, by cancellation, signal leakage from antenna to transmitter of a received signal.

An advantage of some embodiments is that antenna interfaces are provided; configured to provide isolation between transmitter and receiver.

An advantage of some embodiments is that isolation may be achieved over a relatively large bandwidth.

An advantage of some embodiments is that the antenna interfaces are robust in relation to impedance variations of transceiver ports (one or more of: transmitter port impedance variations, receiver port impedance variations, and antenna port impedance variations).

An advantage of some embodiments is that the loss in the transmission path is relatively low. Optimization, or at least improvement, of the transmission path may be beneficial for system efficiency.

An advantage of some embodiments is that no adjustable dummy load is needed, which reduces the circuit complexity compared to some prior art approaches.

An advantage of some embodiments is that perfect (or close to perfect) cancellation can be obtained even with a non-ideal transformer; due to that the cancellation is achieved through an impedance.

An advantage of some embodiments is that antenna interfaces are provided, which are suitable for communication standards with low power and/or full-duplex requirements (e.g., Bluetooth low energy, BLE, mesh).

An advantage of some embodiments is that adequate performance is achievable even with non-ideal components.

An advantage of some embodiments is that they are suitable for full integration in complementary metal oxide semiconductor (CMOS) technology, or any other suitable semiconductor technology.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where antenna interface arrangements are provided that mitigate signal leakage from transmitter to receiver and/or leakage of a received signal from antenna to transmitter. Mitigation is accomplished by cancellation.

The transmit signal leakage may be completely or partially cancelled at the receiver according to various embodiments. Embodiments presented herein aim to achieve the cancellation of the transmit signal leakage by addition, at the receiver, of a signal which has the same amplitude and opposite phase (i.e., π, or 180°, phase difference) compared to the leaked portion of the transmit signal.

The received signal leakage may be completely or partially cancelled at the transmitter according to various embodiments. Embodiments presented herein aim to achieve the cancellation of the received signal leakage by addition, at the transmitter, of a signal which has the same amplitude and opposite phase (i.e., π, or 180°, phase difference) compared to the leaked portion of the received signal.

Some embodiments are suitable for transceivers where an antenna is shared by transmitter and receiver. Alternatively or additionally, some embodiments are suitable for transceivers where transmission and reception occurs simultaneously and/or in a same frequency interval; e.g., time division duplex (TDD) transceivers, and/or full duplex transceivers or half-duplex transceivers.

Some embodiments are suitable for communication devices (e.g., wireless communications devices) comprising transceivers. Example communication devices include a user equipment (UE), a base station (BS), or any other radio access node.

It should be noted that, even if the antenna interface arrangement is described herein in the context of wireless transceivers comprising an antenna, the antenna interface arrangement is equally applicable in other contexts as well. For example, the antenna interface arrangement may be used for a transceiver configured for communication over a wired medium. In such an example, the parts of the antenna interface arrangement which are connectable to an antenna port are simply connected to a non-antenna port of the transceiver.

Thus, when a part is described herein as connectable to an antenna port of a transceiver, it should be understood that the part is equally connectable to a non-antenna port of a transceiver, wherein the non-antenna port is a port for communication medium access.

The antenna interface arrangements described herein may be fully integrated in complementary metal oxide semiconductor (CMOS) technology, or any other suitable semiconductor technology, according to some embodiments.

The antenna interface arrangements described herein are transformer-based and may be viewed as an application of passive cancellation approaches.

As will be apparent from the following examples, the antenna interface arrangement of some embodiments uses a signal sensed at the transmitter port of a transceiver for cancellation of transmit signal leakage to the receiver port, and an impedance is used to adjust the amplitude (and phase) for cancellation. Similarly, the antenna interface arrangement of some embodiments uses a signal sensed at the receiver port of a transceiver for cancellation of received signal leakage to the transmitter, and an impedance is used to adjust the amplitude (and phase) for cancellation.

Figure 1:
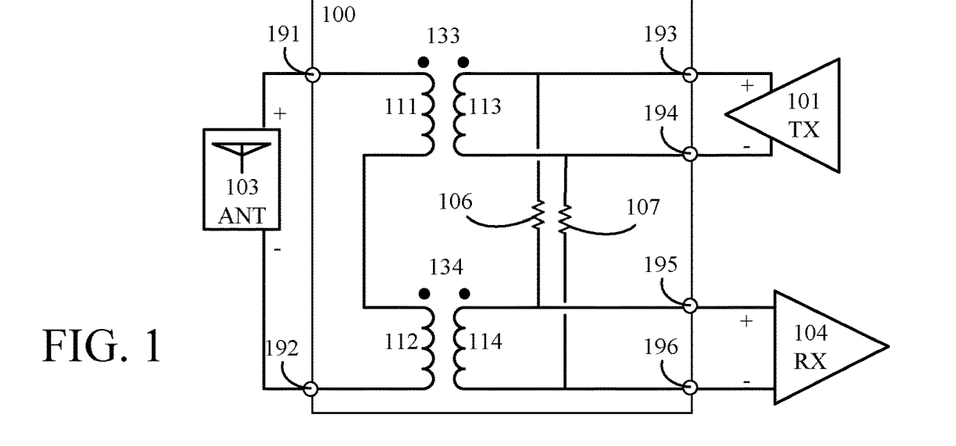
FIG. 1 is a schematic drawing illustrating example arrangements according to some embodiments.

FIG. 1 schematically illustrates an example arrangement according to some embodiments.

FIG. 1 shows an example antenna interface arrangement 100 for cancellation of a transmit signal at a receiver port of a transceiver. Example connection of the antenna interface arrangement to a transmitter (TX) 101, a receiver (RX) 104, and an antenna (ANT) 103 of a transceiver is also shown.

The antenna interface arrangement 100 comprises an impedance (illustrated in FIG. 1 as two resistors 106, 107) and a distributed transformer. The distributed transformer has a primary side winding with a first part 111 and a second part 112, a first secondary side winding 113, and a second secondary side winding 114. The first secondary side winding 113 has a first inductive coupling 133 to the first part 111 of the primary side winding, and the second secondary side winding 114 has a second inductive coupling 134 to the second part 112 of the primary side winding.

In the transceiver exemplified in FIG. 1, the transmitter port, the receiver port, and the antenna port are differential ports having a positive terminal and a negative terminal.

A first end of the first part 111 of the primary side winding is connectable to one of the terminals 191 (terminal "+" in this example) of the antenna port of the transceiver, a second end of the first part 111 of the primary side winding is connected to a first end of the second part 112 of the primary side winding, and a second end of the second part 112 of the primary side winding is connectable to the other one of the terminals 192 (terminal "−" in this example) of the antenna port of the transceiver.

A first end of the first secondary side winding 113 is connectable to one of the terminals 193 (terminal "+" in this example) of the transmitter port of the transceiver, and a second end of the first secondary side winding 113 is connectable to the other one of the terminals 194 (terminal "−" in this example) of the transmitter port of the transceiver.

A first end of the second secondary side winding 114 is connectable to one of the terminals 195 (terminal "+" in this example) of the receiver port of the transceiver, and a second end of the second secondary side winding 114 is connectable to the other one of the terminals 196 (terminal "−" in this example) of the receiver port of the transceiver.

The impedance is connected between the first secondary side winding 113 and the second secondary side winding 114. More specifically, in this implementation, the resistor 106 is connected between the first end of the first secondary side winding and the first end of the second secondary side winding, and the resistor 107 is connected between the second end of the first secondary side winding and the second end of the second secondary side winding.

Generally, the first and second inductive couplings are adapted to provide a first version of the transmit signal at the receiver port, and the impedance is adapted to provide a second version of the transmit signal at the receiver port. Also generally, it is an aim that the second version of the transmit signal cancels the first version of the transmit signal. One way to achieve this is to provide the second version of the transmit signal as having the same amplitude and opposite phase as the first version of the transmit signal.

In the implementation shown in FIG. 1, the first and second inductive couplings 133, 134 are non-inverting inductive couplings, and the resistors are coupled between transmitter and receiver ports with the same polarity (i.e., one resistor 106 is connected between the positive terminal "+" of the transmitter port and the positive terminal "+" of the receiver port, and the other resistor 107 is connected between the negative terminal "−" of the transmitter port and the negative terminal "−" of the receiver port). Thereby, a phase impact of the first and second inductive couplings 133, 134 on the transmit signal and a phase impact on the transmit signal of the impedance 106, 107 has a modulo $2\pi$ phase difference equal to $\pi$ (i.e., opposite phases) for a periodic transmit signal.

The impedance 106, 107 should preferably be selected such that cancellation of transmit signal leakage to the receiver port is achieved and/or such that cancellation of received signal leakage to the transmitter port is achieved. This may, for example, be accomplished by selecting the impedance 106, 107 such that an amplitude impact of the first and second inductive couplings 133, 134 on the transmit signal is equal to an amplitude impact on the transmit signal of the impedance 106, 107.

Other example antenna interface arrangements for cancellation of a transmit signal at a receiver port of a transceiver may be achieved by letting both first and second inductive couplings 133, 134 be inverting inductive couplings in FIG. 1.

Generally, it should be noted that one or more of the antenna interface arrangements exemplified herein (e.g., the example antenna interface arrangement 100 of FIG. 1) may also provide cancellation of a received signal at the transmitter port of the transceiver. Particularly, the first inductive coupling may be further adapted to provide a first version of the received signal at the transmitter port, and the second inductive coupling and the impedance may be further adapted to provide a second version of the received signal at the transmitter port. Also generally, it is an aim that the second version of the received signal cancels the first version of the received signal. One way to achieve this is to provide the second version of the received signal as having the same amplitude and opposite phase as the first version of the received signal, which one or more of the antenna interface arrangements exemplified herein achieve.

Also generally (assuming that the antenna port is port 1, the transmitter port is port 2, and the receiver port is port 3, and that S12 represents the coupling from transmitter to antenna, S31 represents the coupling from antenna to receiver, S32 represents the coupling from transmitter to receiver, and S23 represents the coupling from receiver to transmitter), it should be noted that the stand-alone transformer used in some embodiments herein allows sharing an antenna between transmitter and receiver (e.g., resulting in a coupling loss of S12=S31=−3 dB for a transformer with identical windings), wherein the transmitter and receiver are magnetically connected by the transformer (e.g., S32=S23=−6 dB for a transformer with identical windings). Isolation between transmitter and receiver is obtainable by using adequately connected resistors (or general impedances). Since no resonance is introduced, the theoretical bandwidth is infinite when the inductors are magnetically coupled.

The magnetic connection between transmitter and receiver introduces 180° phase rotation if the inductive couplings 133 and 134 are either both non-inverting or both inverting, and isolation between transmitter and receiver is obtainable by connecting resistors between port terminals of the same polarity.

The magnetic connection between transmitter and receiver introduces no phase rotation if one of the inductive couplings is non-inverting and the other one of the inductive couplings is inverting, and isolation between transmitter and receiver is obtainable by connecting resistors between port terminals of different polarity.

Figure 2:
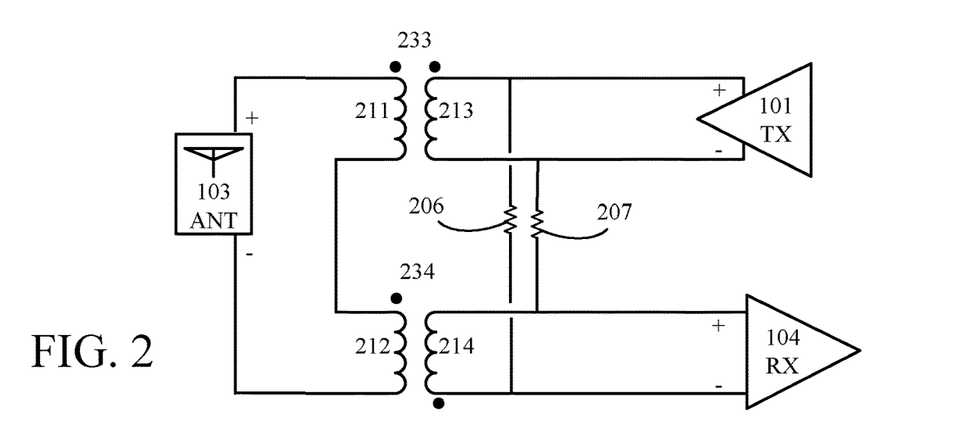
FIG. 2 is a schematic drawing illustrating example arrangements according to some embodiments.

FIG. 2 schematically illustrates an example arrangement according to some embodiments.

FIG. 2 shows an example antenna interface arrangement for cancellation of a transmit signal at a receiver port of a transceiver when connected to a differential port transmitter (TX) 101, a differential port receiver (RX) 104, and a differential port antenna (ANT) 103 of a transceiver. The boundary of the antenna interface arrangement (compare with 100 of FIG. 1) and the transceiver ports (compare with 191, 192, 193, 194, 195, 196 of FIG. 1) are omitted for simplicity of representation.

The antenna interface arrangement comprises an impedance (illustrated in FIG. 2 as two resistors 206, 207) and a distributed transformer. The distributed transformer has a primary side winding with a first part 211 and a second part 212, a first secondary side winding 213, and a second secondary side winding 214. The first secondary side winding 213 has a first inductive coupling 233 to the first part 211 of the primary side winding, and the second secondary side winding 214 has a second inductive coupling 234 to the second part 212 of the primary side winding.

A first end of the first part 211 of the primary side winding is connectable to one of the terminals (terminal "+" in this example) of the antenna port of the transceiver, a second end of the first part 211 of the primary side winding is connected to a first end of the second part 212 of the primary side winding, and a second end of the second part 212 of the primary side winding is connectable to the other one of the terminals (terminal "−" in this example) of the antenna port of the transceiver.

A first end of the first secondary side winding 213 is connectable to one of the terminals (terminal "+" in this example) of the transmitter port of the transceiver, and a second end of the first secondary side winding 213 is connectable to the other one of the terminals (terminal "−" in this example) of the transmitter port of the transceiver.

A first end of the second secondary side winding 214 is connectable to one of the terminals (terminal "+" in this example) of the receiver port of the transceiver, and a second end of the second secondary side winding 214 is connectable to the other one of the terminals (terminal "−" in this example) of the receiver port of the transceiver.

The impedance is connected between the first secondary side winding 213 and the second secondary side winding 214. More specifically, in this implementation, the resistor 206 is connected between the first end of the first secondary side winding and the second end of the second secondary side winding, and the resistor 207 is connected between the second end of the first secondary side winding and the first end of the second secondary side winding.

In the implementation shown in FIG. 2, the first inductive coupling 233 is a non-inverting inductive coupling, the second inductive coupling 234 is an inverting inductive coupling, and the resistors are coupled between transmitter and receiver ports of different polarity (i.e., one resistor 206 is connected between the positive terminal "+" of the transmitter port and the negative terminal "−" of the receiver port, and the other resistor 207 is connected between the negative terminal "−" of the transmitter port and the positive terminal "+" of the receiver port). Thereby, a phase impact of the first and second inductive couplings 233, 234 on the transmit signal and a phase impact on the transmit signal of the impedance 206, 207 has a modulo $2\pi$ phase difference equal to $\pi$ (i.e., opposite phases) for a periodic transmit signal.

The impedance 206, 207 should preferably be selected such that cancellation of transmit signal leakage to the receiver port is achieved and/or such that cancellation of received signal leakage to the transmitter port is achieved. This may, for example, be accomplished by selecting the impedance 106, 107 such that an amplitude impact of the first and second inductive couplings 233, 234 on the transmit signal is equal to an amplitude impact on the transmit signal of the impedance 206, 207.

Other example antenna interface arrangements for cancellation of a transmit signal at a receiver port of a transceiver may be achieved by letting the first inductive coupling 233 be an inverting inductive coupling and letting the second inductive coupling 234 be a non-inverting inductive coupling in FIG. 1.

Figure 3:
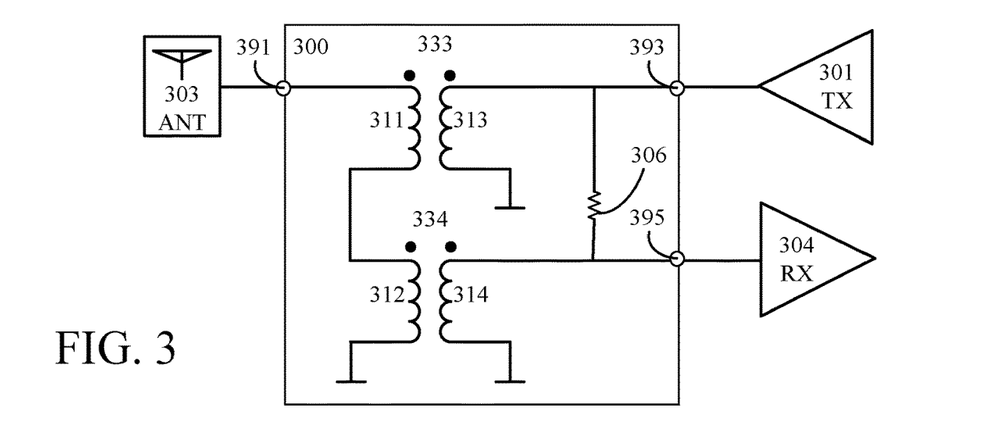
FIG. 3 is a schematic drawing illustrating example arrangements according to some embodiments.

FIG. 3 schematically illustrates an example arrangement according to some embodiments.

FIG. 3 shows an example antenna interface arrangement 300 for cancellation of a transmit signal at a receiver port of a transceiver. Example connection of the antenna interface arrangement to a transmitter (TX) 301, a receiver (RX) 304, and an antenna (ANT) 303 of a transceiver is also shown.

The antenna interface arrangement 300 comprises an impedance (illustrated in FIG. 3 as resistor 306) and a distributed transformer. The distributed transformer has a primary side winding with a first part 311 and a second part 312, a first secondary side winding 313, and a second secondary side winding 314. The first secondary side winding 313 has a first inductive coupling 333 to the first part 311 of the primary side winding, and the second secondary side winding 314 has a second inductive coupling 334 to the second part 312 of the primary side winding.

In the transceiver exemplified in FIG. 3, the transmitter port, the receiver port, and the antenna port are single-ended ports.

A first end of the first part 311 of the primary side winding is connectable to the antenna port 391 of the transceiver, a second end of the first part 311 of the primary side winding is connected to a first end of the second part 312 of the primary side winding, and a second end of the second part 312 of the primary side winding is connectable to a reference potential (e.g., a ground potential).

A first end of the first secondary side winding 313 is connectable to the transmitter port 393 of the transceiver, and a second end of the first secondary side winding 313 is connectable to a reference potential (e.g., a ground potential).

A first end of the second secondary side winding 314 is connectable to the receiver port 395 of the transceiver, and a second end of the second secondary side winding 314 is connectable to a reference potential (e.g., a ground potential).

The impedance 306 is connected between the first end of the first secondary side winding 313 and the first end of the second secondary side winding 314.

In the implementation shown in FIG. 3, the first and second inductive couplings 333, 334 are non-inverting inductive couplings. Thereby, a phase impact of the first and second inductive couplings 333, 334 on the transmit signal and a phase impact on the transmit signal of the impedance 306 has a modulo $2\pi$ phase difference equal to $\pi$ (i.e., opposite phases) for a periodic transmit signal.

The impedance 306 should preferably be selected such that cancellation of transmit signal leakage to the receiver port is achieved and/or such that cancellation of received signal leakage to the transmitter port is achieved. This may, for example, be accomplished by selecting the impedance 106, 107 such that an amplitude impact of the first and second inductive couplings 333, 334 on the transmit signal is equal to an amplitude impact on the transmit signal of the impedance 306.

Other example antenna interface arrangements for cancellation of a transmit signal at a receiver port of a transceiver may be achieved by letting both first and second inductive couplings 133, 134 be inverting inductive couplings in FIG. 3.

Figure 4:
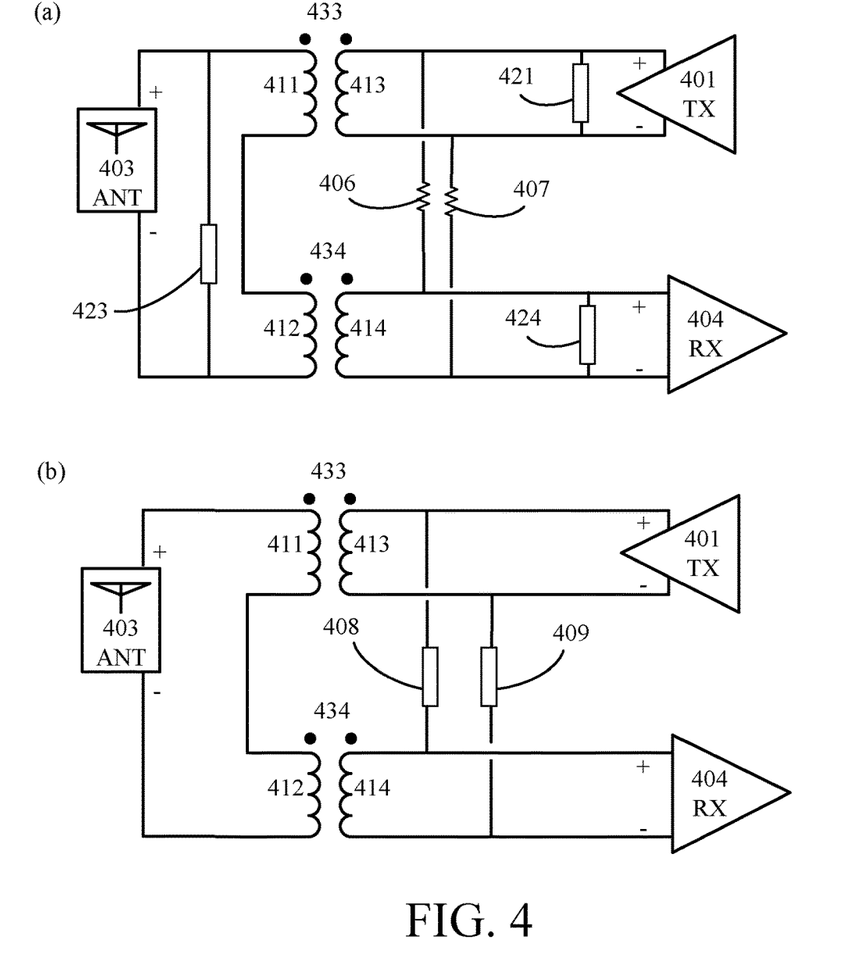
FIG. 4 is a schematic drawing illustrating an example arrangement according to some embodiments.

Part (a) of FIG. 4 schematically illustrates an adjusted example arrangement according to some embodiments. The adjusted example antenna interface arrangement of part (a) in FIG. 4 is similar to the example antenna interface arrangement 100 illustrated in FIG. 1, with the addition of one or more circuit elements 421, 423, 424. Corresponding adjustments—i.e., addition of one or more circuit elements—may be applied in relation to any of the other example antenna interface arrangements described herein (e.g., in FIG. 2, or in FIG. 3).

The adjusted example antenna interface arrangement of part (a) in FIG. 4 is for cancellation of a transmit signal at a receiver port of a transceiver. Example connection of the antenna interface arrangement to a transmitter (TX) 401, a receiver (RX) 404, and an antenna (ANT) 403 of a transceiver is also shown.

In similarity with FIG. 1, the antenna interface arrangement comprises an impedance (exemplified as two resistors 406, 407) and a distributed transformer. The distributed transformer has a primary side winding with a first part 411 and a second part 412, a first secondary side winding 413, and a second secondary side winding 414. The first secondary side winding 413 has a first inductive coupling to the first part 411 of the primary side winding, and the second secondary side winding 414 has a second inductive coupling to the second part 412 of the primary side winding. The impedance and the distributed transformer are arranged in a similar manner as those of FIG. 1.

The antenna interface arrangement of part (a) in FIG. 4 further comprises one or more of a first circuit element (e.g., an antenna port impedance 423), a second circuit element (e.g., a transmitter port impedance 421), and a third circuit element (e.g., a receiver port impedance 424).

The first circuit element 423 may be connected in parallel to the primary side winding 411, 412, the second circuit element 421 may be connected in parallel to the first secondary side winding 413, and the third circuit element 424 may be connected in parallel to the second secondary side winding 414, as illustrated in part (a) in FIG. 4.

Generally, when an impedance is referred to herein it is meant to encompass one or more of a purely real valued impedance (resistance), a purely imaginary valued impedance (capacitance or inductance), and any combination thereof in the form of a complex valued impedance. Thus, any of the first, second, and third circuit element may comprise a real valued part and/or an imaginary valued part.

Any of the first, second, and third circuit element may be adapted to compensate imperfections of the distributed transformer and/or impedance mismatches, in accordance with any suitable compensation approach.

Antenna interface arrangements with addition of one or more port impedances as exemplified in part (a) in FIG. 4, may be particularly useful when one or more of the transceiver ports are non-ideal. One or more of the port impedances may be tunable to accommodate impedance variations of one or more of the transceiver ports.

Part (b) of FIG. 4 schematically illustrates an example arrangement according to some embodiments. The adjusted example antenna interface arrangement of part (b) in FIG. 4 is similar to the example antenna interface arrangement 100 illustrated in FIG. 1, but shows the impedance in a more general implementation. Corresponding generalization—i.e., switching one or more resistor to a complex valued impedance—may be applied for any of the other example antenna interface arrangements described herein (e.g., in FIG. 2, in FIG. 3, or in part (a) of FIG. 4).

The antenna interface arrangement of part (b) in FIG. 4 is for cancellation of a transmit signal at a receiver port of a transceiver. Example connection of the antenna interface arrangement to a transmitter (TX) 401, a receiver (RX) 404, and an antenna (ANT) 403 of a transceiver is also shown.

In similarity with FIG. 1, the antenna interface arrangement comprises an impedance (exemplified as two impedances 408, 409; each comprising a real valued part and/or an imaginary valued part) and a distributed transformer. The distributed transformer has a primary side winding with a first part 411 and a second part 412, a first secondary side winding 413, and a second secondary side winding 414. The first secondary side winding 413 has a first inductive coupling to the first part 411 of the primary side winding, and the second secondary side winding 414 has a second inductive coupling to the second part 412 of the primary side winding. The impedance and the distributed transformer are arranged in a similar manner as those of FIG. 1.

In addition to the conditions for selecting impedance values described in connection with FIG. 1, the complex valued impedances in part (b) of FIG. 4 may be adapted to compensate imperfections of the distributed transformer and/or impedance mismatches, in accordance with any suitable compensation approach.

Generally, one or more of a size of the first part of the primary side winding, a size of the second part of the primary side winding, a size of the first secondary side winding, a size of the second secondary side winding, the impedance value (compare with 408, 409), and the circuit element value(s) (compare with 421, 423, 424) may be selected for matching of transmitter port impedance and/or receiver port impedance and/or antenna port impedance.

A distributed transformer, as applied in various embodiments herein, may have any suitable ratio (e.g., ratio 1:1, 1:2, etc.).

Figure 5:
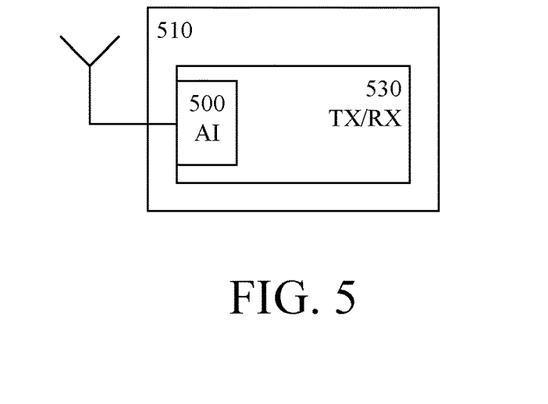
FIG. 5 is a schematic block diagram illustrating an example apparatus according to some embodiments.

FIG. 5 schematically illustrates an example apparatus 510 according to some embodiments. The apparatus 510 may, for example, be a communication device. The apparatus comprises a transceiver (TX/RX) 530 and an antenna interface arrangement (AI) 500. The transceiver may be a full-duplex transceiver or a half-duplex transceiver. Alternatively or additionally, the transceiver may be a TDD transceiver. The antenna interface arrangement 500 may be any of the antenna interface arrangements described in connection to FIGS. 1-4.

Generally, the distributed transformers of the various embodiments presented herein may be implemented in any suitable manner. The distributed transformer may be an ideal transformer (coupling factor k=1) or a non-ideal transformer (coupling factor k<1, e.g., k=0.85). Some loss may result from using a non-ideal transformer and the phase shift may not be perfect (i.e., 0° or 180°). However, the isolation and noise figure of the antenna interface arrangement are mainly determined by the cancellation impedance, and remain relatively low even for non-ideal transformers.

Also generally, each of the impedances and/or circuit elements exemplified herein may comprise a real valued part and/or an imaginary valued part, as suitable (even if exemplified as purely resistive in any of the Figures). For example, an impedance and/or a circuit element may be purely resistive, purely capacitive, purely inductive, or any combination thereof. Furthermore, an impedance and/or a circuit element may be implemented using any suitable means (e.g., connecting resistor(s), capacitor(s), coil(s) in any parallel and/or serial arrangement).

Typically, the cancellation impedances (106, 107, 206, 207, 306, 406, 407, 408, 409) may be selected based on (e.g., equal to, or with equal absolute value as, corresponding) port impedances.

To accommodate challenges caused by a non-ideal transformer (and/or non-ideal impedances of transmitter/receiver/antenna ports), one or more reactive elements may be introduced in the antenna interface arrangement (e.g., to obtain the desirable cancelling phase difference). FIG. 4 represents examples of how this may be implemented.

One embodiment targeting a non-ideal transformer comprises the impedances 408, 409 illustrated in part (b) of FIG. 4; each comprising a functionally serial connection of a resistance and an inductance.

One embodiment targeting non-ideal impedances of transmitter/receiver/antenna ports uses the arrangement illustrated in FIG. 3 for impedance matching by sizing the windings of the transformer to achieve desirable matching for transmitter and receiver ports. For example, assuming that the antenna port experiences 50Ω, the transmitter port experiences 30Ω and the receiver port experiences 70Ω, the resistor 306 may be selected close to the 30Ω of the transmitter port (e.g., 35Ω), the first and second parts 311, 312 of the primary side winding may be equally sized, the first secondary side winding 313 may be sized to one third of the first part 311 of the primary side winding, and the second secondary side winding 314 may be sized to seven fifths of the second part 312 of the primary side winding.

Embodiments may appear within an electronic apparatus (such as a transceiver or a communication device) comprising arrangements, circuitry, and/or logic according to any of the embodiments described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

It should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. An antenna interface arrangement for cancellation of a transmit signal at a receiver port of a transceiver, the antenna interface arrangement comprising:

a distributed transformer comprising:
- a primary side winding connectable to an antenna port of the transceiver and comprising a first part and a second part;
- a first secondary side winding connectable to a transmitter port of the transceiver and having a first inductive coupling to the first part of the primary side winding; and
- a second secondary side winding connectable to the receiver port of the transceiver and having a second inductive coupling to the second part of the primary side winding,
- wherein the first inductive coupling and the second inductive coupling are adapted to provide a first version of the transmit signal at the receiver port; and an impedance connected between the first secondary side winding and the second secondary side winding, wherein:
- the impedance is adapted to provide a second version of the transmit signal at the receiver port, and
- the second version of the transmit signal is arranged to cancel the first version of the transmit signal at the receiver port.

2. The antenna interface arrangement of claim 1, wherein:
the antenna interface arrangement is also for cancellation of a received signal at the transmitter port of the transceiver;
the first inductive coupling is further adapted to provide a first version of the received signal at the transmitter port;
the second inductive coupling and the impedance are further adapted to provide a second version of the received signal at the transmitter port; and
the second version of the received signal is arranged to cancel the first version of the received signal at the transmitter port.

3. The antenna interface arrangement of claim 1, wherein a first end of the first part of the primary side winding is connectable to the antenna port of the transceiver;
a second end of the first part of the primary side winding is connected to a first end of the second part of the primary side winding;
a first end of the first secondary side winding is connected to the impedance and is connectable to the transmitter port of the transceiver; and
a first end of the second secondary side winding is connected to the impedance and is connectable to the receiver port of the transceiver.

4. The antenna interface arrangement of claim 3, wherein:
the transmitter port, the receiver port, and the antenna port are single-ended; and
a second end of the second part of the primary side winding, a second end of the first secondary side winding, and a second end of the second secondary side winding are connectable to a reference potential.

5. The antenna interface arrangement of claim 4, wherein the first and second inductive couplings are non-inverting inductive couplings.

6. The antenna interface arrangement of claim 3, wherein:
the transmitter port, the receiver port, and the antenna port are differential ports having a positive terminal and a negative terminal;
a second end of the second part of the primary side winding is connectable to the antenna port of the transceiver;
a second end of the first secondary side winding is connectable to the transmitter port of the transceiver; and
a second end of the second secondary side winding is connectable to the receiver port of the transceiver.

7. The antenna interface arrangement of claim 6, wherein:
the first and second inductive couplings are non-inverting inductive couplings; and
the impedance comprises:
- a first impedance connectable between the positive terminal of the transmitter port and the positive terminal of the receiver port, and
- a second impedance connectable between the negative terminal of the transmitter port and the negative terminal of the receiver port.

8. The antenna interface arrangement of claim 6, wherein:
one of the first and second inductive couplings is an inverting inductive coupling,
the other one of the first and second inductive couplings is a non-inverting inductive coupling; and
the impedance comprises:
- a first impedance connectable between the positive terminal of the transmitter port and the negative terminal of the receiver port, and
- a second impedance connectable between the negative terminal of the transmitter port and the positive terminal of the receiver port.

9. The antenna interface arrangement of claim 1, wherein the impedance comprises at least one of the following: a real valued part, and an imaginary valued part.

10. The antenna interface arrangement of claim 9, wherein the impedance is adapted to compensate at least one of the following: imperfections of the distributed transformer, and impedance mismatches.

11. The antenna interface arrangement of claim 1, further comprising one or more circuit elements, including any of the following:
- a first circuit element connected in parallel to the primary side winding;
- a second circuit element connected in parallel to the first secondary side winding; and
- a third circuit element connected in parallel to the second secondary side winding, wherein:
  - each of the one or more circuit elements comprises at least one of the following: a real valued part, and an imaginary valued part; and
  - each of the one or more circuit elements is adapted to compensate at least one of the following: imperfections of the distributed transformer, and impedance mismatches.

12. The antenna interface arrangement of claim 1, wherein one or more of the following is selected or configured for matching impedance of at least one of the transmitter port and the receiver port:
- a size of the first part of the primary side winding of the distributed transformer,
- a size of the second part of the primary side winding of the distributed transformer,
- a size of the first secondary side winding of the distributed transformer,
- a size of the second secondary side winding of the distributed transformer, and
- the impedance.

13. The antenna interface arrangement of claim 1, wherein an amplitude impact of the impedance on the transmit signal is equal to an amplitude impact on the transmit signal of a combination of the first inductive coupling and the second inductive coupling.

14. The antenna interface arrangement of claim 1, wherein a phase impact of the impedance on the transmit signal and a phase impact on the transmit signal of a combination of the first inductive coupling and the second inductive coupling has a modulo $2\pi$ phase difference equal to $\pi$ for a periodic transmit signal.

15. A transceiver comprising the antenna interface arrangement of claim 1.

16. The transceiver of claim 15, wherein the transceiver is a full duplex transceiver or a half-duplex transceiver.

17. The transceiver of claim 15, wherein the transceiver is a time division duplex (TDD) transceiver.

18. A communication device comprising the transceiver of claim 15.

* * * * *

UNITED STATES PATENT AND TRADEMARK OFFICE
CERTIFICATE OF CORRECTION

| | |
|---|---|
| PATENT NO. | : 11,855,679 B2 |
| APPLICATION NO. | : 17/802287 |
| DATED | : December 26, 2023 |
| INVENTOR(S) | : Mesquita et al. |

It is certified that error appears in the above-identified patent and that said Letters Patent is hereby corrected as shown below:

In the Specification

In Column 3, Line 57, delete "multiplex" and insert -- duplex --, therefor.

Signed and Sealed this
Thirtieth Day of April, 2024

Katherine Kelly Vidal
*Director of the United States Patent and Trademark Office*